3,219,464
PROCESS FOR DEHYDRATING POTATOES
Morton S. Cole, Minneapolis, Minn., assignor to The Pillsbury Company, Minneapolis, Minn., a corporation of Delaware
No Drawing. Filed July 2, 1962, Ser. No. 206,999
18 Claims. (Cl. 99—207)

This invention relates generally to the art of vegetable dehydration, and more particularly to the art of dehydrating mashed potatoes to produce a product which is readily rehydratable by the addition of a suitable liquid.

Two main problems have been encountered in the art of producing palatable dehydrated mashed potatoes. These relate to the properties of taste and texture which characterize the end product, and the capability of a process to yield a product which duplicates the flavor and texture of mashed potatoes produced directly from cooked potatoes. Over the past fifty years much effort has been expended to improve these properties and as a result of this effort dried mashed potatoes have become a significant item of commerce.

The present products of commerce are, however, deficient in many respects and much room for improvement still remains. Detectable differences in flavor and texture still exist between the presently available dried products and mashed potatoes made directly from cooked potatoes. Moreover, the products of processes known heretofore have little tolerance to high temperatures and/or mechanical mixing during rehydration and become quite pasty if rehydrated at temperatures above 170° F. or with vigorous mixing.

Many texture deficiencies of rehydrated dried mashed potatoes are known to be caused at least in part by the presence of free starch which results from the breakdown of potato cells during processing. For this reason, many of the processes previously suggested have incorporated techniques for preventing the breakdown of potato cells. For example, in the production of the variety of dried mashed potatoes known as granules, approximately 85 percent of the output of the drier is recycled and mixed with the freshly mashed potatoes to reduce potato cell rupture. In the process for producing dehydrated potatoes in the form of flakes, which process is the subject of U.S. Patents Numbers 2,759,832, 2,780,552, 2,787,553 and 3,012,897, a variety of techniques are employed to minimize cell breakdown. According to the overall process as disclosed in these patents, potatoes are:

(1) Pre-cooked at 140 to 180° F.;
(2) Cooled by water having a temperature of 70° F. or less for at least 14 minutes;
(3) Cooked until soft enough to mash; and then
(4) Mashed and dried, either in the form of a sheet by means of a heated rotating drum, or in the form of granules in a fluidized bed drier.

Of these steps, the cooling step (2) is prominent and is the subject matter of the last of the aforementioned patents.

As previously mentioned, even though these present processes produce marketable products having acceptable taste and texture properties, there is still much room for improvement.

It is, therefore, the general object of the present invention to provide a process for producing dehydrated mashed potatoes having taste and texture properties superior to those of the products presently available.

Another object is to provide a process for producing dehydrated mashed potatoes having increased tolerance to mechanical mixing and high temperatures during rehydration.

The cooling step of the potato flake process described above is disadvantageous with respect to both processing time and cost.

Accordingly, it is a further object of the invention to provide a process which does not require a cooling step to produce a product having a quality at least as high as the quality of the product produced by a process having a cooling step.

Other objects will become apparent from an examination of the following description of the invention and the claims attached thereto.

In accordance with the present invention, the above objects are attained by conducting at least a portion of the cooking step in a process for producing dehydrated potatoes in a buffer system of sufficient concentration to maintain the pH of the system between 6 and 8 during cooking. It has been discovered that such control of pH provides a dehydrated product of very superior texture properties while eliminating the need for such prior techniques as recycling of product or prolonged cooling of potatoes during the process.

Although any buffer system which is capable of maintaining the pH within the above-prescribed range, without producing inedible residues in the dehydrated product, is suitable for use in the invention, the alkali metal phosphates are preferred. Of this group, the potassium and sodium phosphates, especially the latter, are preferred.

A sodium or potassium phosphate concentration of at least 0.01 M is sufficient to maintain pH control throughout the cooking of most potatoes. An upper limitation on the concentration of buffer is imposed only when an undesirable "chemical flavor" is produced in the final product. In general, the concentration is most desirably maintained between 0.01 and 0.05 M.

Within the pH range of 6 to 8 mentioned above, two narrower ranges are preferred. These narrower ranges lie equidistant from a pH of 7 and are the ranges of 6 to 6.5 and 7.5 to 8.0. As is well known, with a phosphate buffer system, a pH within the range of 6 to 8 can be obtained by varying the proportions of monobasic and dibasic phosphates.

Although advantages can be derived from cooking in a buffer system in any process for preparing dehydrated mashed potatoes, including both potato flake and granule processes, it is preferable to utilize a process in which suitably prepared potatoes are: (a) pre-cooked in the presence of the phosphate buffer system; (b) cooked finally in steam or water without the presence of buffer; (c) mashed; and, (d) then dried as a thin sheet on a heated rotating drum drier. In the preferred process, the pre-cooking step is conducted at temperatures within the range of 140 and 180° F., preferably between 160 to 165° F. for times ranging from 15 to 45 minutes. At this point the potatoes are taken from the buffered pre-cooking water and placed in hot water or in steam, preferably the latter, for a time sufficient to produce a product which can be mashed (approximately 20 to 30 minutes).

Although the product resulting from utilization of a phosphate buffer system in the cooking water produces a satisfactory product, it has been discovered that the presence of a small amount of at least one halide salt of an alkali-metal selected from the group consisting of sodium chloride and potassium chloride in the cooking water in addition to the phosphate buffer surprisingly produces an even superior product. For reasons which presently are not fully understood, the flavor and texture of products cooked in the combined salts are markedly superior to products cooked only in a buffered solution. Moreover, such products are also superior to dehydrated potatoes presently available. Suitable concentrations of salt in the cooking water range up to 0.2 M, preferably within the range 0.03 to 0.1 M.

Thus, in the most preferred form of the invention, raw potatoes are subjected to conventional peeling, trimming and slicing operations and are then pre-cooked from 15 to 45 minutes at temperatures ranging between 160 to 165° F. in water containing phosphate buffers, the concentration of which ranges between 0.01 and 0.05 M, and in addition at least one halide salt of an alkali-metal selected from the group consisting of sodium chloride and potassium chloride at concentrations between 0.03 and 0.1 M. After the pre-cooking operation is completed, the potatoes are transferred, without the necessity of cooling, into a final cooker containing plain hot water or atmospheric steam and maintained therein for a time sufficient to produce a product tender enough to mash. The fully-cooked potatoes are then mashed in any suitable manner after which conventional additives (preservatives and emulsifiers) may be added. The potatoes are then dehydrated in the form of a thin sheet by means of a drum drier.

The improvements of the present invention are available using all varieties of potatoes. Among the varieties which have been used experimentally are Idaho russets, Pontiacs, Cobblers, Kennebecs and Snowflakes. Improvements in the properties of the dehydrated product were achieved.

To facilitate a more complete understanding of the present invention, the following illustrative examples are offered:

Example 1

*Run A.*—50 pounds of Idaho potatoes were peeled, trimmed and cut into slices. The sliced potatoes were cooked in water having a temperature of 165° F. until tender enough to mash and were immediately mashed without cooling below the cooking temperature. The potatoes were then conventionally dried on a single drum drier and broken into flakes.

*Run B.*—An equal amount of potatoes were peeled, trimmed and sliced as above described and cooked until tender at 165° F. in a water solution containing sodium chloride at a concentration of 0.060 M and sodium phosphate at a concentration of 0.012 M (0.001 M in disodium phosphate, 0.011 M in monosodium phosphate which provided a pH of 6.4 in the cooking water). These cooked potatoes were immediately mashed and dried on a single drum drier to produce dried flakes.

Samples of the dehydrated potato flakes produced by each of the processes described above were rehydrated using 90 grams of flakes per two cups (472 ml.) of water having a temperature of 168° F. and tasted. The product resulting from Run B exhibited a natural flavor whereas the product of Run A manifested a pronounced starch flavor. Moreover, the Run A product had a very pasty texture in comparison to the mealy texture of the product from Run B.

Samples of the flakes of each process were also rehydrated as described above and mixed with a Hobart mixer until a pasty texture developed. The product of Run B withstood mixing for 5 minutes before a pasty texture was detected. However, the product resulting from Run A developed pastiness within one minute.

The product of Run A was judged wholly unacceptable for sale whereas the product resulting from Run B was satisfactory for sale, although as will be illustrated hereinafter, a more suitable product can be made. It should be noted that acceptable potato flakes were produced in Run B in a single stage cooking step without the need of a cooling step.

Example 2

*Run C.*—Forty pounds of raw Pontiac potato slices were pre-cooked for 30 minutes at 165° F. in a water solution containing sodium phosphates at a concentration of 0.012 M (0.001 M in disodium phosphate, 0.011 M in monosodium phosphate which provided a pH of 6.4 in the cooking water). The pre-cooked potatoes were transferred without cooling to a steamer and cooked by means of atmospheric steam (212° F.) until tender. The resulting cooked potatoes were mashed and subjected to conventional drum drying from which approximately 5 pounds of dehydrated potato flakes were obtained.

*Run D.*—A second batch of Idaho russets were peeled, trimmed and sliced and then pre-cooked at 165° F. for 20 minutes. They were then placed in 60° F. water for 15 minutes and after cooling, were transferred to a chamber containing atmospheric steam and cooked until tender enough to mash. After being mashed, the potatoes were dehydrated in a thin sheet on a single drum drier.

The products from Runs C and D were rehydrated with water having a temperature of 170° F. and were found to have equally acceptable flavors. In a test to determine the tolerance of the product to mechanical mixing, samples of each product were rehydrated at temperatures between 165 and 170° F. The product of Run C withstood 3 minutes mixing in a Hobart mixer before pastiness developed whereas the product of Run D exhibited pastiness after only 2 minutes' mixing.

Example 3

*Run E.*—Fifty pounds of raw potato slices were pre-cooked for 30 minutes at 165° F. in a water solution containing sodium phosphates at a concentration of 0.012 M (0.001 M in disodium phosphate, 0.011 M in monosodium phosphate which provided a pH of 6.4 in the cooking water), and sodium chloride at a concentration of 0.060 M. The pre-cooked potatoes were then transferred to a steamer and cooked in atmospheric steam (212° F.) until tender. The resulting cooked potatoes were mashed and dehydrated by conventional means using a single drum drier. Approximately 8 pounds of dehydrated potato flakes resulted.

The product of Run E was rehydrated with water at a temperature of 185 to 190° F. As soon as the water had been absorbed by the flakes, the mash was mixed mechanically with a Hobart mixer and examined periodically. The products of Run C and Run D were similarly prepared and subjected to mechanical beating. Whereas the product of Run E subjected to this treatment of high water temperatures and mechanical mixing remained acceptable after 10 minutes of beating, a period far in excess of what would normally be required in home or institutional use, the product of Run D was unacceptable due to excessively pasty texture after only one minute of beating, and of doubtful quality after only 30 seconds of mechanical mixing. The product of Run C was unacceptable after 2 minutes' of beating and quite pasty after one minute of mechanical mixing.

When lower water temperatures were employed (165 to 170° F.) in combination with the mechanical mixing described above, the product of Run E again was acceptable after 10 minutes of mixing while the product of Run D was unacceptable following 3 minutes of mixing and the product of Run C was unacceptable after 4 minutes of mechanical mixing.

The above demonstrates the increased cell strength which has been brought about by the combination of buffer and salt in the cooking process employed in Run E.

As regards flavor, the product of Run E was judged far superior to the products of Runs C and D.

Example 4

*Run F.*—Raw sliced potatoes were prepared by the procedure described in Run E above with the exception that potassium phosphate and potassium chloride were used in place of the sodium salts. Upon rehydration, the resulting product was found to be acceptable with respect to both flavor and texture although it was judged to be somewhat inferior to the product resulting from Run C.

It should be apparent that the examples set forth above are merely illustrative of the invention and should not be interpreted in a limiting sense. Many modifications of and deviations from the process described may be made. For example, atlhough the use of buffered cooking water simplifies potato dehydration by eliminating a need for a time-consuming cooling step, a very satisfactory product can be made using a buffered pre-cooking step together with a cooling step. Changes from the given process conditions of time, temperature and pH can be made within the ranges previously set forth. Therefore, the invention should be limited only by the claims appended hereto.

The invention thus being described, what is claimed is:

1. In a process for preparing dehydrated mashed and peeled potatoes comprising at least one cooking step followed by:
    (A) Mashing the resulting cooked potatoes; and
    (B) Dehydrating the resulting mashed potatoes;
the improvement which comprises conducting one of said cooking step in a water solution containing a phosphate buffer adapted to produce an edible residue in a sufficient amount to maintain the pH thereof between 6 and 8.

2. The improvement of claim 1 wherein said buffer consists of at least one phosphate salt of an alkali metal.

3. The improvement of claim 1 wherein said buffer consists of at least one phosphate salt of an alkali metal selected from the group consisting of sodium and potassium.

4. The improvement of claim 2 wherein said buffer consists of a mixture of disodium and monosodium phosphate.

5. The improvement of claim 4 wherein said monosodium and disodium phosphates are in such proportions as to maintain the pH of said cooking water between 6 and 6.5.

6. The improvement of claim 4 wherein said monosodium and disodium phosphates are in such proportions as to maintain the pH of said cooking water between 7.5 and 8.

7. The improvement of claim 4 wherein the total concentration of said phosphate salts in the cooking water is between 0.01 M and 0.05 M.

8. In a process for preparing dehydrated mashed and peeled potatoes comprising at least one cooking step followed by:
    (A) Mashing the resulting cooked potatoes; and
    (B) Dehydrating the resulting mashed potatoes;
the improvement which comprises conducting one of said cooking step in a water solution containing a phosphate buffer adapted to produce an edible residue in a sufficient amount to main the pH thereof between 6 and 8; and at least one halide salt of an alkali metal selected from the group consisting of sodium chloride and potassium chloride.

9. In a process for preparing dehydrated mashed and peeled potatoes comprising at least one cooking step followed by:
    (A) Mashing the resulting cooked potatoes; and
    (B) Dehydrating the resulting mashed potatoes;
the improvement which comprises conducting one of said cooking step in a water solution containing a sufficient amount of at least one phosphate salt of an alkali metal selected from the group consisting of sodium and potassium in an amount sufficient to maintain the pH of said water solution between 6 and 8; and at least one halide salt of an alkali metal selected from the group consisting of sodium chloride and potassium chloride at a concentration up to 0.2 M.

10. In a process for preparing dehydrated mashed and peeled potatoes comprising at least one cooking step followed by:
    (A) Mashing the resulting cooked potatoes; and
    (B) Dehydrating the resulting mashed potatoes;
the improvement which comprises conducting one of said cooking step in a water solution containing a mixture of monosodium and disodium phosphates at a concentration of 0.01 to 0.05 M and sodium chloride at a concentration of 0.03 to 0.1 M.

11. In a process for preparing dehydrated mashed and peeled potatoes comprising the steps of:
    (A) Precooking raw potatoes in water at a temperature ranging from 140 to 180° F. for 15 to 45 minutes;
    (B) Cooking the pre-cooked potatoes until said potatoes are tender;
    (C) Mashing the cooked tender potatoes; and
    (D) Dehydrating the resulting mashed potatoes;
the improvement which comprises conducting the pre-cooking step in a water solution containing a phosphate buffer adapted to produce an edible residue in a sufficient amount to maintain the pH thereof between 6 and 8 through said pre-cooking step.

12. The improvement of claim 11 wherein said buffer consists of at least one phosphate salt of an alkali metal selected from the group consisting of sodium and potassium.

13. The improvement of claim 12 wherein said buffer is a mixture of monosodium and disodium phosphates present at a concentration of within the range of 0.01 to 0.05 M.

14. In a process for preparing dehydrated mashed and peeled potatoes comprising the steps of:
    (A) Pre-cooking raw potatoes in water at a temperature ranging from 140 to 180° F. for 15 to 45 minutes;
    (B) Cooking the pre-cooked potatoes until said potatoes are tender;
    (C) Mashing the cooked tender potatoes; and
    (D) Dehydrating the resulting mashed potatoes;
the improvement which comprises conducting the pre-cooking steps in a water solution containing a phosphate buffer adapted to produce an edible residue in a sufficient amount to maintain the pH thereof between 6 and 8 throughout said pre-cooking step; and at least one halide salt of an alkali metal selected from the group consisting of sodium chloride and potassium chloride.

15. In a process for preparing dehydrated mashed and peeled potatoes comprising the steps of:
    (A) Pre-cooking raw potatoes in water at a temperature ranging from 140 to 180° F. for 15 to 45 minutes;
    (B) Cooking the pre-cooked potatoes until said potatoes are tender;
    (C) Mashing the cooked tender potatoes; and
    (D) Subjecting the resulting mashed potatoes to dehydration in a thin sheet on a heated drum;
the improvement which comprises conducting the pre-cooking step in a water solution containing a sufficient amount of a phosphate buffer to maintain the pH thereof between 6 and 8 throughout said pre-cooking step.

16. The improvement of claim 15 wherein said buffer consists of at least one phosphate salt of an alkali metal selected from the group consisting of sodium and potassium.

17. The improvement of claim 16 wherein said buffer is a mixture of monosodium and disodium phosphate present at a concentration within the range of 0.01 to 0.05 M.

18. In a process for preparing dehydrated mashed and peeled potatoes comprising the steps of:
    (A) Pre-cooking raw potatoes in water at a temperature ranging from 140 to 180° F. for 15 to 45 minutes;

(B) Cooking the pre-cooked potatoes until said potatoes are tender;

(C) Mashing the cooked tender potatoes; and (D) Subjecting the resulting mashed potatoes to dehydration in a thin sheet on a heated drum;

the improvement which comprises conducting the pre-cooking step in a water solution containing a phosphate buffer adapted to produce an edible residue in a sufficient amount to maintain the pH thereof between 6 and 8 throughout said pre-cooking step; at least one halide salt of an alkali metal selected from the group consisting of sodium chloride and potassium chloride.

References Cited by the Examiner

UNITED STATES PATENTS

| 1,259,635 | 3/1918 | King | 99—207 |
| 2,784,094 | 3/1957 | Sives | 99—207 |
| 2,787,553 | 4/1957 | Cording et al. | 99—207 |
| 2,973,276 | 2/1961 | Cyr | 99—207 |
| 3,027,258 | 3/1962 | Markakis | 99—207 |

FOREIGN PATENTS

| 567,270 | 2/1945 | Great Britain. |

A. LOUIS MONACELL, *Primary Examiner.*

HYMAN LORD, *Examiner.*